United States Patent Office 3,793,445
Patented Feb. 19, 1974

3,793,445
REAGENT FOR RADIOIMMUNOASSAY
Stuart J. Updike and Theodore L. Goodfriend, Madison, Wis., assignors to Wisconsin Alumni Research Foundation, Madison, Wis.
No Drawing. Filed Apr. 29, 1970, Ser. No. 33,098
Int. Cl. A61k 27/04; G01n 31/06, 33/16
U.S. Cl. 424—12                                      3 Claims

ABSTRACT OF THE DISCLOSURE

A wettable polymer gel containing at least one binding protein physically and essentially permanently entrapped in the gel matrix, the gel having a pore size which will essentially prevent the diffusion of the binding protein through the gel but will not prevent the diffusion of smaller molecules to the sites of the binding protein within the gel matrix. The gel is prepared by polymerizing the gel monomer while admixed with antiserum. It is useful in assaying for antigens or haptenes.

SPECIFICATION

This invention relates to immobilized binding proteins.
More specifically, this invention relates to wettable polymer gels in the matrix of which binding proteins, e.g. antibody proteins, are physically and essentially permanently entrapped.

Prior to this invention wettable polymer gels have been used in immunoprecipitation reactions and for immunoelectrophoresis but in all cases have functioned merely as anticonvection and support media with the pore size of the gel being small enough to permit the accomplishment of such function but large enough to allow the migration of binding (antibody) protein through the gel by diffusion or electrophoresis. In contrast, in the present invention the pore size of the gel is small enough to physically, and essentially permanently, entrap in the gel matrix a binding protein with the capacity to bind specific smaller molecules without altering the smaller molecules, but large enough to allow such smaller molecules to diffuse to the binding protein sites within the gel matrix. Examples of proteins having a binding capacity for certain specific smaller molecules and which can be readily immobilized in a polymer gel in accordance with this invention are globulins and antibodies.

As a matter of convenience the present invention will be described primarily in relation to a system wherein the binding protein is an antibody. This should not be construed as limiting the invention however, and various changes in the details thereof or materials involved may be made by those skilled in the art within the scope of the appended claims.

Polyacrylamide gels are eminently suitable for the purposes of the present invention. Although either acrylamide monomer or cross-linking reagent (e.g. N,N'-methylene-bis-acrylamide) alone will form a polymeric gel, neither alone can be used to produce a gel satisfactory for the purposes of this invention. In all cases, both the monomer and the cross-linking reagent must be made part of the gel recipe. Sufficient cross-linking reagent must be added to the recipe to stabilize the desired pore size, and sufficient monomer must be present to not only provide the desired pore size, but to give the gel the density necessary to permit its rapid sedimentation when prepared in particulate form. Rapid sedimentation is a desirable characteristic because it avoids having to carry out centrifugation or filtration to separate the gel phase from the extra gel phase during application of the gel in analytical procedures. In addition, the acrylamide monomer reagent must be used in the recipe in amounts sufficient to make the resulting gel particles rigid enough to function in physical configurations adaptable to flowing stream or chromatographic techniques. For example, ratios of cross-linking reagent to monomer in the range from about 1:4 to 1:10 and total polymer gel concentration in the range of 12 to 35% (concentration percent=weight of dry polymer monomer and cross-linking reagent/volume of polymer solution×100) will provide gels with the desired average pore size, density and rigidity to realize optimal benefits for the applications described herein. In contrast, in previous immunoprecipitation or immunoelectrophoresis assays utilizing polymer gels, a polymer gel recipe concentration of about 2-7% was used. Such concentrations are not suitable for the purposes of the present invention since the polymerized system obtained with such concentrations will not essentially permanently entrap binding proteins (antibodies). Rather, the binding proteins will readily wash out of the system and its benefits will be lost.

A gel which responds to the criteria set forth above and which entraps 7 S gamma globulin (mol wt. 150,000) but allows diffusion of molecules like angiotensin (mol. wt. 1000) can be prepared as follows:

8 grams of acrylamide and one gram of N,N'-methylene-bis-acrylamide is dissolved to a final volume of 36 ml. in sodium phosphate buffer solution (0.1 M, pH 7.4) containing a suitable dilution of antiserum. To the resulting solution 0.1 ml. of a suspension of 100 mg. of riboflavin in 20 ml. of distilled water and 0.02 ml. of N,N,N',N'-tetramethyl-ethylenediamine is added, followed by 0.2 mg. of sodium hydrosulfite. The admixture, in a suitable vessel, is stoppered and agitated and then is exposed to light from an ordinary tungsten electric light bulb to induce photopolymerization. The polymerization is complete in 5–15 minutes. To prevent the heat generated by the exothermic polymerization reaction from adversely affecting the binding protein the reaction vessel is continuously chilled in an ice water bath.

The gel system obtained from the above procedure is generally much more effective for purposes of antigen or haptene assays if a large surface area is exposed so that diffusion of the antigen or haptene into the gel system is facilitated. Such large surface area can be obtained by fragmenting the gel into particles. For example, a gel obtained in the foregoing procedure was broken up with a spatula, forced through a 40 mesh brass screen and collected on an 80 mesh screen. The particles on the screen were washed with several liters of sodium phosphate buffer solution (0.01 M, pH 7.6) and stored at 4° C. in the same buffer solution. The gel particles were milky white granules which settled quickly and could be more tightly packed by low-speed centrifugation. It has also been found that such gel particles can be lyophilized if prolonged storage appears to be in order.

The effective porosity of the gel system, to accommodate molecules of different sizes, may be altered by changing the percentage of polymer ingredients introduced into the recipe or by changing the ratio of acrylamide to the cross-linking reagent, N,N'-methylene-bis-acrylamide. Changes in the screen mesh size used for fragmentation and sieving of the gel, will produce changes in the size and sedimentation characteristics of gel granules and in the rate of equilibration of intra-gel and ambient aqueous phases during gel application.

Alternative to forming gel particles as indicated above, other gel configurations which give beneficially large surface area exposure, such as strings, rods, castings and tubes can be advantageously employed. It is anticipated, for example, that for assay purposes a thin layer of antibody-containing gel coated on a strip of filter or other type of paper could be very effective. Such configurations would find particular application in continuous flow systems for diagnostic purposes or for the therapeutic removal of excess antigen or hormones, for example, from a patient's blood stream. Antigen bound to antibody immobilized in gel can be eluted by salt or acid solutions, or thermally, to permit the immobilized antibody to be reused.

It is to be noted that in the general procedure set out hereinbefore for preparing antibody-containing gel the antibody protein, as a dilution of antiserum, is added to the gel recipe before polymerization is induced. In contrast, in the previously known immunoprecipitation or immunoelectrophoresis technique, the antibody protein is allowed to diffuse into the gel or is electrophoresed through the gel after the polymerization reaction has taken place.

The gel systems of this invention are highly useful in the clinical laboratory for analyzing for a variety of antigens and haptenes including drugs, polypeptide hormones and steroid hormones. For example, the immobilization of specific corticosteroid binding globulins in small gel particles, which is achievable with this invention, would allow assay of corticosteroid hormones in addition to the many polypeptide hormones for which radioimmunoassay methods have already been described. Such systems are based on the radioimmunoassay technique originally described by R. S. Yallow and S. A. Berson (J. Clin. Invest., 39, 1157, 1960). In this method radioactive haptene and assay sample compete for a limited number of specific binding sites. In this system concentration of the radioactive haptene varies inversely with the concentration of the assay sample fixed to binding protein.

The following examples are illustrative of the present invention as applied to the angiotensin-antiangiotensin system.

Gel particles were prepared in accordance with the procedure outlined hereinbefore but using various dilutions of antisera as indicated in the following table. With the final volume of the gel being 36 ml., as set forth in the aforedescribed procedure, it is important that, at the various dilutions shown in the table, namely, 1:300, 1:1000 and 1:3000, and a final volume of 36 ml., the amounts of antisera added to prepare the gel were respectively $$\frac{1}{300} \times 36$$

or 0.12 ml.

$$\frac{1}{1000} \times 36$$

or 0.036 ml. and $$\frac{1}{3000} \times 36$$

or 0.012 ml. A constant quantity of angiotensin labeled with radioactive iodine ($^{125}I$) and varying quantities of unlabeled anigotensin were incubated with 0.5 ml. aliquots of gel particles suspended in an equal volume of sodium phosphate buffer solution (0.01 M, pH 7.6), all volumes being equalized at 1.0 ml., for 18 hours at 4° C. After such time the supernatant was decanted, the gel was washed three times with 2.5 ml. of the cold phosphate buffer solution and the retained radioactivity counted. The results obtained are shown in the following table.

| Example | Serum entrapped in polyacrylamide gel | Labeled antigen | Unlabeled antigen | Proportion of labeled antigen retained by gel (percent) |
|---------|---------------------------------------|-----------------|-------------------|----------------------------------------------------------|
| 1       | None                                  | Angiotensin-$^{125}I$ | 0 | [1] 6 |
|         | Pooled rabbit serum                   | do              | 0                 | 6 |
|         | Anti-angiotensin 1:3,000 [2]          | do              | 0                 | 7 |
|         | ....do                                | do              | ([3])             | 5 |
|         | ....do                                | do              | 0                 | 67 |
|         | ....do                                | do              | ([3])             | 10 |
|         | None                                  | Tyrosine-5-bradykinin-$^{125}I$ | 0 | [1] 3 |
|         | Pooled rabbit serum                   | do              | 0                 | 3 |
|         | Anti-angiotensin 1:300                | do              | 0                 | 4 |
| 2       | Anti-angiotensin 1:1,000              | Angiotensin-$^{125}I$ | 0 | 21 |
|         | Anti-angiotensin 1:1,000; gel lyophilized and reconstituted 14 days later | do | 0 | 18 |
| 3       | Anti-angiotensin 1:1,000              | do              | 0                 | 21 |
|         | Anti-angiotensin 1:1,000, gel stored at 4° C. in buffer for 60 days | do | 0 | 22 |

[1] Mechanically trapped labeled antigen.
[2] Ratios indicate serum dilutions.
[3] Angio 100 mµg.

Broadly, the gel systems of this invention are applicable for the assay of any substance the molecules of which are small enough to readily diffuse through a gel in which a protein is entrapped which is characterized by binding capabilities specific to the substance being assayed. Substances susceptible of such assaying techniques are, for example, angiotensin, insulin, growth hormone, gonadotropic hormone, parathyroid hormone, glucagon, cortisol, estrogen and drugs like digoxin and thyroxin. This system is characterized in its novelty by offering an assay technique that is more rapid than techniques now commonly in use, that facilitates the step of separating bound from unbound radioactivity by providing particles large enough and heavy enough to sediment rapidly and that protects the biologically active entrapped proteins from interference by high molecular weight substances, such as proteolytic enzymes or endogenous antibody, which may be present in the sample containing the substance to be assayed.

It was found that the curve obtained in plotting gel-retained radioacitvity versus unlabeled angiotensin from the angiotensin-antiangiotensin system run with polyacrylamide gel-immobilized antiserum matched curves from simultaneous experiments using soluble antibody precipitated with ammonium sulfate, and antibody adsorbed on plastic tubes (see T. Goodfriend, D. Ball and S. Updike, Immunochemistry, vol. 6, pp. 484–488, Pergamon Press, 1969). Such curves and the foregoing examples illustrate that antiserum trapped in polyacrylamide retains its specificity, experimental reproducibility and antigen affinity, is stable in cold solution for at least 60 days and withstands lyophilization.

Having thus described the invention what is claimed is:

1. A method for preparing a regent suitable for measuring antigens and haptenes by competitive radioimmunoassay techniques which comprises dissolving acrylamide monomer and N,N'-methylene-bis-acrylamide, as a cross-linking agent, in a physiologic buffer solution containing a dilution of an antibody protein having a binding capacity for said antigens or haptenes, the said monomer and cross-linking agent being present in the ratio of from about 4:1 to about 10:1 and sufficient to provide a total polymer gel concentration in the range from about 12 to about 35% and inducing polymerization of the acrylamide in the solution, whereby an acrylamide polymer gel matrix is obtained having a pore size which prevents free diffusion of the antibody protein which remains entrapped therein while permitting the antigens and haptenes of lower molecular weight to enter the intra gel volume for complexing with the binding sites and prepared in particulate form.

2. The reagent suitable for radioimmunoassay purposes prepared by the method of claim 4.

3. In a method for assaying for antigens and haptenes utilizing competitive radioimmunoassay techniques, the improvement which comprises contacting a solution containing the radioactively tagged and untagged antigen or haptene for which the assay is being made with an acrylamide polymer gel in particulate form having a total polymer gel concentration in the range from about 12 to about 35% and having an antibody protein specific to the antigen or haptene being assayed physicallly entrapped within the gel matrix in which the polymer gel has a pore size which prevents free diffusion of the protein which remains entrapped therein while permitting the antigens and haptenes to diffuse into the intra gel volume for complexing with the binding sites, whereby the antigen or haptene can diffuse to the sites of the antibody protein entrapped within the gel to react therewith and become bound thereby and whereby the entrapped antibody is insulated from interference by high molecular weight substances in the reaction system.

References Cited
UNITED STATES PATENTS

| 3,074,853 | 1/1963 | Brewer | 424—12 |
| 3,573,922 | 4/1971 | Rust | 204—159.24 |

OTHER REFERENCES

Bernfeld, Science, vol. 142, Nov. 8, 1963, pp. 678–679.

Kabat, Exptl. Immunochem. C. C. Thomas, Springfield, Ill., 1961, pp. 78–85, 97–99, 326–327, 333–334.

Hicks, Analytical Chem., vol. 38, May 1966, pp. 726–730.

Bier, Electrophoresis, vol. II, 1967, Academic Press, New York, pp. 392–407.

Poznanski, Clin. Chem., vol. 15, No. 9, 1969, pp. 908–918.

ALBERT T. MEYERS, Primary Examiner

A. P. FAGELSON, Assistant Examiner

U.S. Cl. X.R.

424—1, 11, 13, 78, 81